United States Patent [19]

Martinson et al.

[11] Patent Number: 5,102,373
[45] Date of Patent: Apr. 7, 1992

[54] AUTOMATED FADER SYSTEM

[75] Inventors: Joseph Martinson, Alhambra; Dale Manquen, Thousand Oaks, both of Calif.

[73] Assignee: Martinsound Technologies, Inc., Alhambra, Calif.

[21] Appl. No.: 444,273

[22] Filed: Dec. 1, 1989

[51] Int. Cl.⁵ ............................................. F16H 7/00
[52] U.S. Cl. ................................... 474/101; 474/133
[58] Field of Search ............... 474/101, 102, 106, 111, 474/133, 134, 137, 140, 148

[56] References Cited

U.S. PATENT DOCUMENTS

| | | | |
|---|---|---|---|
| 981,390 | 1/1911 | Rice | 474/133 X |
| 1,204,371 | 11/1916 | McFeely | 474/133 X |
| 4,498,889 | 2/1985 | Stevens et al. | 474/133 |

Primary Examiner—Thuy M. Bui
Attorney, Agent, or Firm—Poms, Smith, Lande & Rose

[57] ABSTRACT

An audio control system including a unique pulley assembly for automated linear movement of the device is disclosed. The pulley assembly includes two pulleys with two different diameters and parallel axes of rotation. A capstan with a different axis of rotation than either of the pulleys is disposed between the two pulleys. A string is wound around the capstan and the circumferences of the pulleys. The diameters of the pulleys are selected such that the turns of the string on the pulley do not overlap.

9 Claims, 4 Drawing Sheets

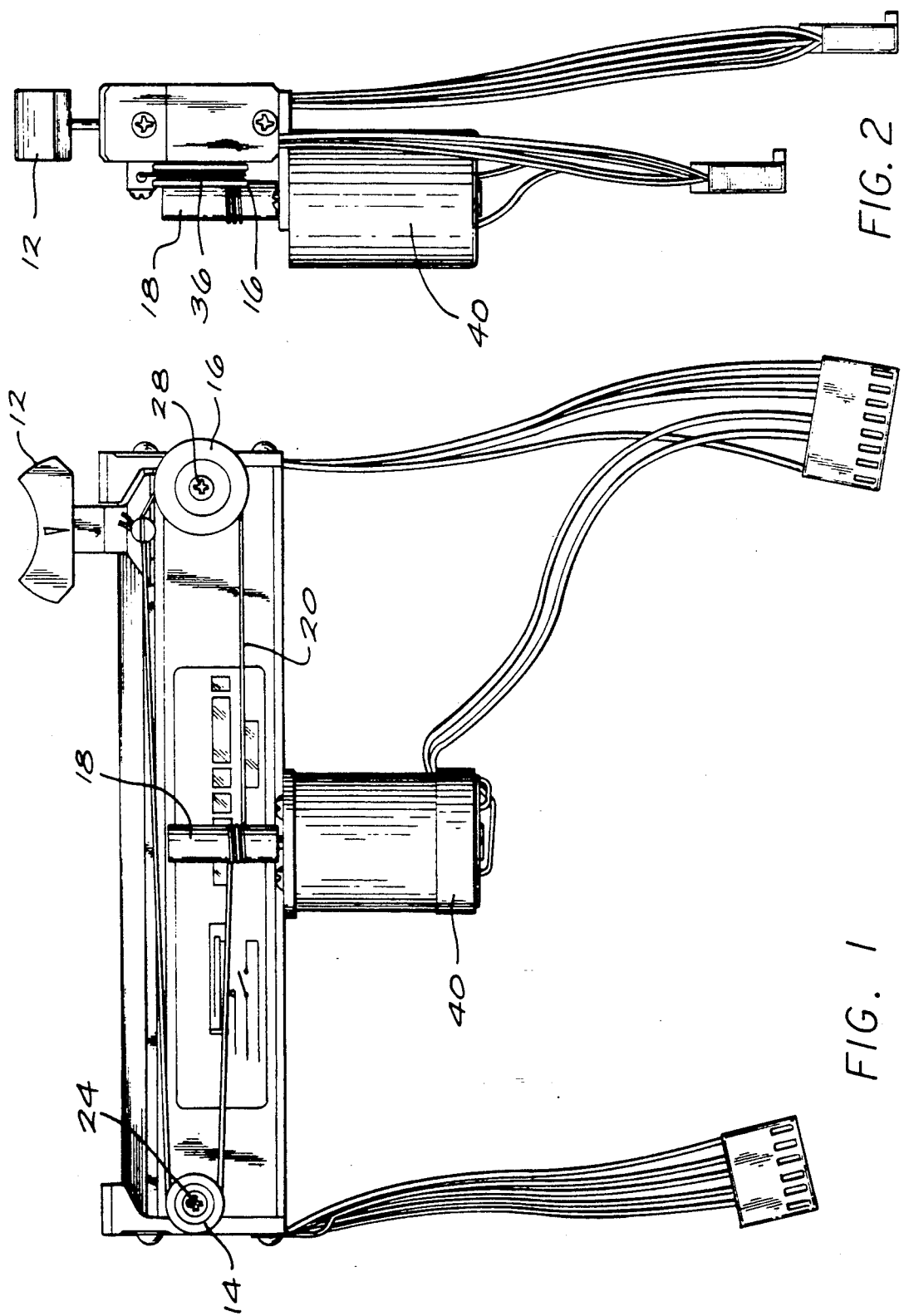

AUTOMATED FADER SYSTEM

BACKGROUND OF THE INVENTION

A common task of audio signal processing is a combining of a multitude of audio sources into a lesser number of channels as dictated by the format of the target final product. To assist the recording engineer with this task, two types of computer based automation systems have been developed which can memorize and recreate any and all of the operator's prior manipulation of the controls.

All systems encode and store position changes of the input devices. Some systems, referred to as "moving fader" systems, can replicate the original motions of the input devices by means of motor driven servo mechanisms with the input device. The replicated movements of the input devices also serve as displays of the current values of the stored information. The majority of these systems also include the audio control element within the servoed input device.

In contrast, the non-motorized automation systems must provide additional devices to display the current values of stored information and to control the audio signal level. The control element in non-servo systems must be independent from the input device so that control changes can occur during replay without any attendant motion of the input device.

Although automation systems have been commercially available, the marketplace demands continued improvements and responsiveness, ease of use and flexibility. A key factor in providing these improvements is the amount of processor time required to quickly respond to system tasks. A common solution is to use multiple general purpose processors to share the workload. A disadvantage and limitation of this approach is that the numerous repetitious instruction fetch cycles required to continuously scan the input/output devices and the communications required between the multiple processors cause a substantial overhead burden which degrade system speed.

SUMMARY OF THE INVENTION

According to the present invention, these disadvantages and limitations of the prior art are overcome by utilizing a dedicated hardware preprocessor to immediately execute repetitious instructions without any need for memory access for instructions. The hardware also provides autonomous monitoring, conversion and correction of the data feeding to and from console controls to minimize central processor workload. The asynchronous communications between the preprocessor and the central processor are fully buffered by dual port and first in/first out (FIFO) memory to eliminate communications overhead.

Other features of the present invention include a novel servo control system, for moving the fader sliders or potentiometers and a novel fader drive mechanism.

These and other objects, advantages and features of the present invention will become readily apparent to those skilled in the art from a study of the following description of an exemplary preferred embodiment when read in conjunction with the attached drawings and appended claims.

BRIEF DESCRIPTION OF THE DRAWING

FIG. 1 is an elevational view of the motorized fader assembly constructed according to the principles of the present invention;

FIG. 2 is a side view of the motorized fader assembly of FIG. 1;

DESCRIPTION OF AN EXEMPLARY PREFERRED EMBODIMENT

Figure 3:
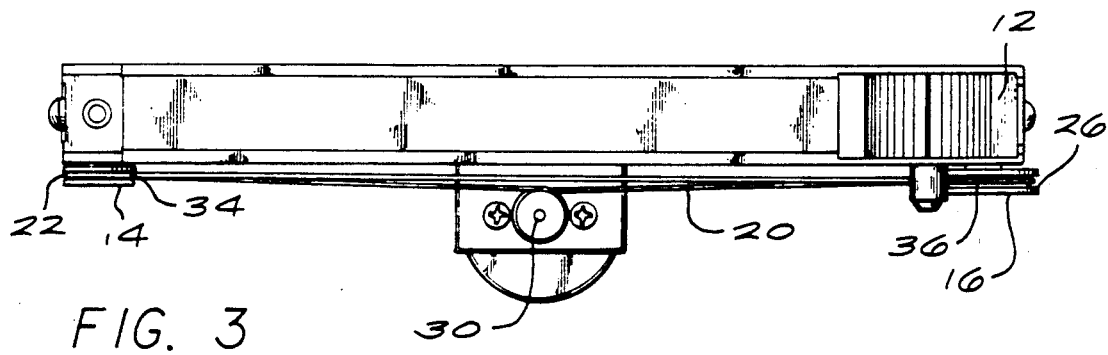
FIG. 3 is a plan view of the motorized fader assembly of FIG. 1.

Referring now to FIGS. 1-4, there is shown a novel pulley assembly 10 adapted for the automated linear movement of a fader potentiometer 12. The assembly 10 includes a first pulley 14, a second pulley 16, a capstan 18 and a string 20.

Figure 4:
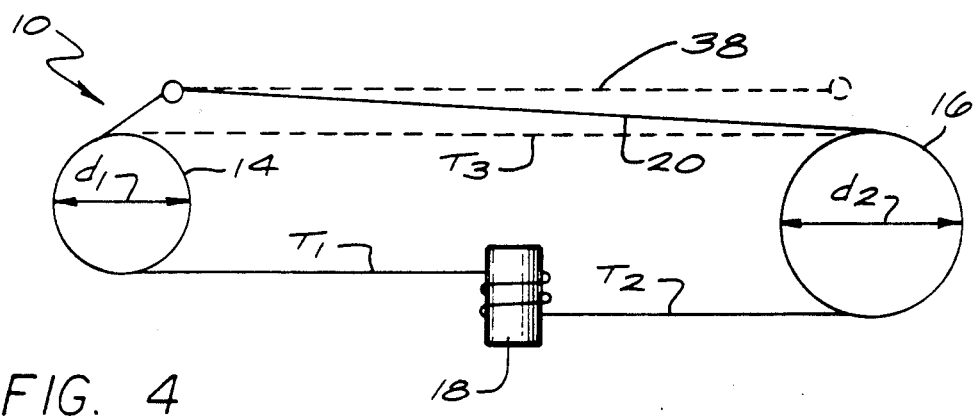
FIG. 4 schematically illustrates the operation of the motorized assembly of FIG. 1.

The first pulley 14 has a first diameter $d_1$ and a circumferential edge 22. The first pulley is rotatable about a first axis 24. The, second pulley 16 has a second diameter $d_2$ and a circumferential edge 26. The second pulley 16 is rotatable about a second axis 28. The capstan 18 is disposed generally intermediate the first pulley 14 and the second pulley 16. The capstan 18 is rotatable about a third axis 30 which is substantially normal to the first axis 24 and the second axis 28. The string 20 is attachable to the fader potentiometer 12, such as by threaded fastener 32. The string 20 is further engagingly wound about the capstan 18 and the circumferential edge 22 of the first pulley 14 and the circumferential edge 26 of the second pulley 16. The first diameter $d_1$ and the second diameter $d_2$ are selected so that the string 20 lies substantially along a first tangent $T_1$ from the first pulley 14 and a second tangent $T_2$ from the second pulley 16 with the tangents spaced apart as shown in FIG. 4, so that successive adjacent turns of the string on the capstan do not engage one another. Each of the first and the second tangent $T_2$ are substantially perpendicular to lines parallel to each of the first axis 24, the second axis 28 and the third axis 30.

As best seen in FIGS. 2 and 3 the circumferential edge 22 of the first pulley 14 and the circumferential edge 26 of the second pulley 16 each has a V-cut groove 34, 36 in which the string 20 is received. The capstan 18 has a generally cylindrical outer surface 38, thus being a straight faced capstan. The string 20, in a preferred embodiment of the present invention, is of cofilament construction and includes a glass fiber core and a polymer sheath. To provide the proper tensioning of the string, as best seen in FIGS. 1 and 4, the string moves the fader potentiometer slider 12 along a line 38 which is parallel to and spaced from a common tangent $T_3$ of the first pulley 14 and the second pulley 16. As described in greater detail hereinbelow, a motor 40 is used to drive the capstan 18.

Figure 5B:
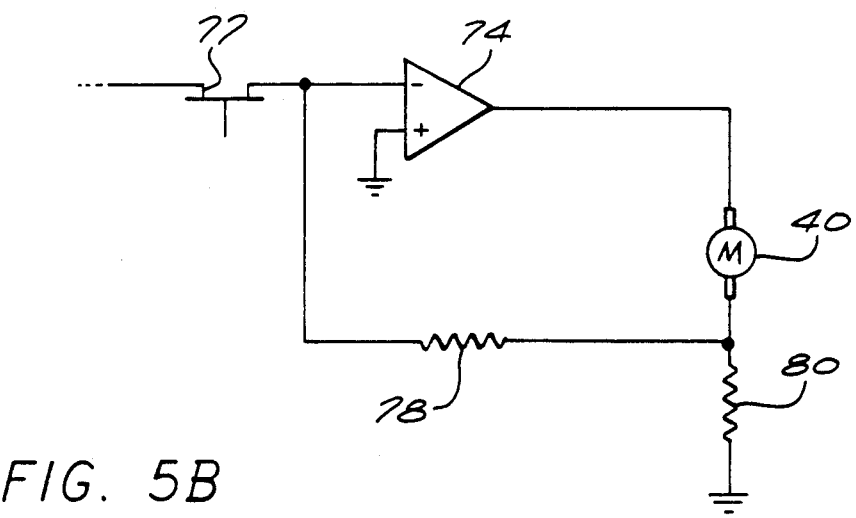
FIGS. 5A and 5B show a functional block diagram of the servo control system constructed according to the principles of the invention.
Figure 5A:
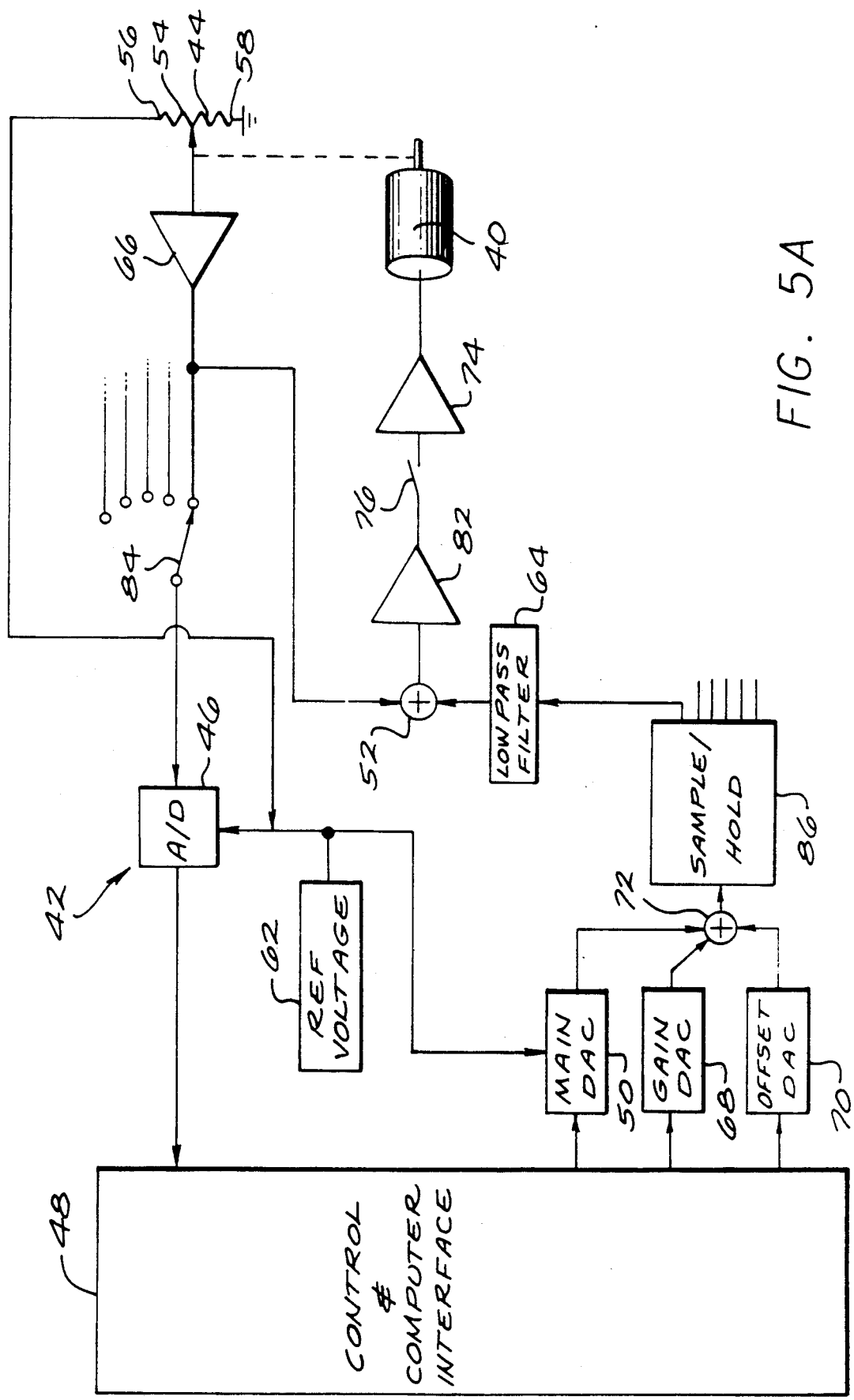

Referring now to FIG. 5A, there is shown a servo control system 42 for detecting the present position of the fader potentiometer slider 12 and to move the fader switch to a selected position. The servo control system, as seen in FIG. 5, illustrates only one channel of the servo control system operable on one fader potentiometer slider 12.

The servo control system 42 includes a position sensor 44, an analog-to-digital converter 46, a controller 48, a digital-to-analog converter 50, a summing circuit 52, and the motor 40 described hereinabove with reference to FIGS. 1–4.

The position sensor 44 in one embodiment of the present invention, is a potentiometer 54 having a first terminal 56, a second terminal 58 and a wiper terminal 60. The wiper terminal 60 is adapted to be mechanically connected to the fader potentiometer 12 so that movement of the fader potentiometer 12 moves the wiper terminal 60. The first terminal 56 is electrically coupled to a source 62 of reference potential, and the second terminal 58 is coupled to ground potential. The position sensor 44 develops a first analog signal at the wiper terminal 60. The first analog signal is indicative of the present position of the fader potentiometer 12.

The analog-to-digital converter 46 converts the first analog signal to a first digital signal. The first digital signal is then applied to the controller 48, as discussed in greater detail hereinbelow, and then develops a second digital signal indicative of the selected position for the fader switch 12 and applies such second digital signal to the digital-to-analog converter 50.

The digital-to-analog converter 50 converts the second digital signal to a second analog signal. The second analog signal is then applied to the summing circuit 52 to develop an electrical signal which is the difference between the first analog signal developed by the position sensor 44 and the second analog signal. The motor 40, which is coupled to the fader potentiometer 12 by the pulley assembly 10 then moves the fader potentiometer 12 to its selected position.

So that the fader potentiometer 12 moves smoothly but the system response remains high, the servo control system 42 further includes a low pass filter 64 electrically coupled between the digital-to-analog converter 50 and the summing circuit 52. The low pass filter 64 is a second order low pass filter having minimal overshoot. Such a filter is also known as a bessel filter.

A buffer amplifier 66 may be electrically connected between the position sensor 44 and the analog-to-digital converter 46. Accordingly, the first analog signal will be developed at the output of the buffer amplifier 66.

To correct for gain and offset errors in the servo control system 42, the system is initialized by moving each fader potentiometer through its full travel under software control. The controller 48 then stores a predetermined gain error digital signal and a predetermined offset error digital signal for each fader potentiometer 12. Accordingly, the servo control system 42 further includes a gain digital-to-analog converter 68 and an offset error digital-to-analog converter 70. The gain converter 68 converts the gain error digital signal to a gain error analog signal. Similarly, the offset error converter converts the offset error digital signal to an offset error analog signal. A second summing circuit 72 sums the gain error analog signal and the offset error analog signal with the second analog signal prior to application to the first summing circuit 52, the signal being coupled through the low pass filter 64.

With further reference to FIG. 5b, an electrical signal from the first summing circuit 52 is applied to the motor 40 through a transconductance motor drive current amplifier 74 and a switch 76 serially coupled between the first summing circuit 52 and the current amplifier 74. One terminal of the motor 40 is coupled to the output of the transconductance amplifier 74. The other terminal of the motor 40 is connected through a feedback resistor 78 to the inverting input of the amplifier 74. A bias resistor 80 is coupled between the common note of the motor and feedback resistor 78 and ground. The switch 76 is open during manual movement of the fader potentiometer 12. The transconductance amplifier 74 will then develop a voltage opposite polarity to the induced EMF voltage developed by the motor during such manual movement to eliminate dynamic braking and to provide freewheeling of the motor. In the prior art, the switch was usually connected to one terminal of the motor with the other terminal grounded. The switch, when open and during manual movement of the motor, would develop substantial dynamic braking. In a preferred embodiment of the present invention, the switch 76 is an FET switch. A compensation amplifier 82 may be electrically coupled between the first summing circuit 52 and the switch 76, Completing the description of FIG. 5A, intermediate the buffer amplifier 66 and the analog-to-digital converter 46 is an input scanner which sequentially scans each channel of the servo control system. Each fader potentiometer 12 is associated with a different channel. Similarly, a sample and hold circuit having an input coupled to the second summing circuit 72. The input scanner 84 and the sample and hold circuit 86 provide for switching between each of the channels. Thus, the circuitry connected to the output of the sample and hold circuit 86 is replicated for each channel. Similarly, the circuitry coupled to the input of the input scanner 84 is also replicated for each channel.

Figure 6:
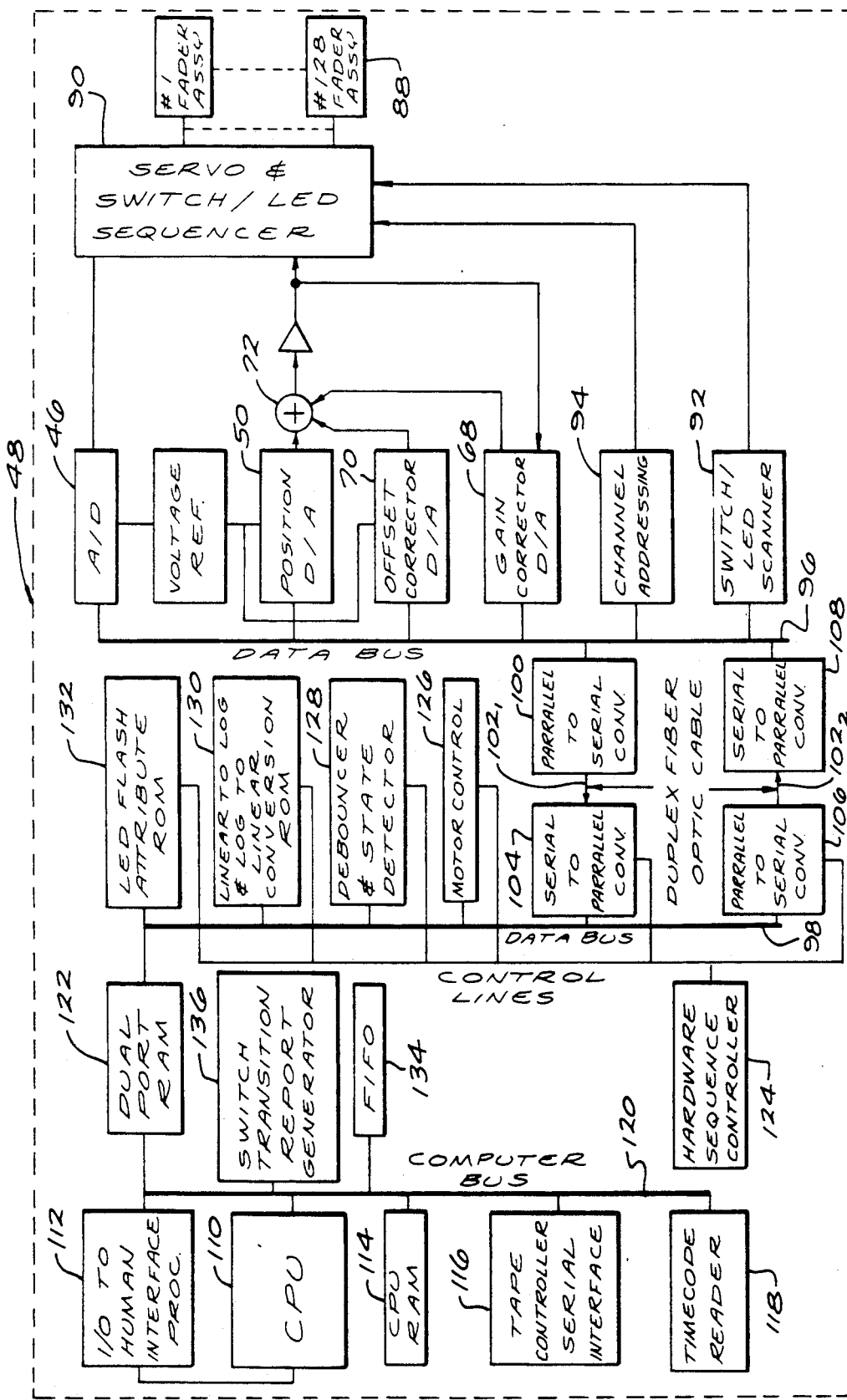
FIG. 6 is a more detailed schematic block diagram of the servo control system of FIG. 5 illustrating the intelligent interface in greater detail.

Referring now to FIG. 6, there is shown a schematic block diagram of the controller 48. It is to be understood that each fader assembly 38 or channel includes the fader potentiometer 12, the sensor 44, motor 40, and the pulley assembly 10. The servo sequencer 90, switch scanner 92, and channel addressing 94 provide the remaining functions for each of the channels described hereinabove with reference to FIG. 5A.

The controller 48 includes a data bus 96 providing communications between the analog-to-digital converter 46, the digital-to-analog converter 50, the offset digital analog converter 70, the gain error digital-to-analog converter 74, the switch scanner 92, and channel addressing 94. The controller 48 further includes a second data bus 98. For communication from data bus 96 to data bus 98, data is passed through a parallel to serial converter 100 and transmitted over one-half of a duplex fiberoptic cable $102_1$ to a serial to parallel converter 104. For communications from data bus 98 to data bus 96, the data is passed through a parallel to serial converter 106 over a second half $102_2$ of the duplex fiberoptic cable 102 through a serial to parallel converter 108. The constant data exchange rate between the controller 48 and the numerous fader assemblies 88 is approximately five megabits per second in each direction and is therefore well suited to the serial communications link through the duplex fiberoptic cable 102. The controller 48 can thus be removed from the main console housing and placed within the chassis which contains the CPU 110 in human interface processor 112. Software for the CPU 110 is contained in the CPU RAM 114 and a tape controller 116. A time code reader 118 is further provided. Connecting each of the immediately described above components is a computer bus 120. Interconnecting the data bus 98 and the computer bus 120 is a dual port RAM 122. A preprocessor 124 executes repetitious instructions without any need for memory access for instructions. The other hardware such as motor control 126, debouncer and state detector 128, conversion ROM 130 and LED flash attribute ROM 132 provides autonomous monitoring, conversion and correction of the data feeding to and from the console controls to minimize the workload on the central processing unit 110. The asynchronous communications between the preprocessor 124 and the central processor 110 are buffered by the dual port RAM 122 and the FIFO memory 134. The asynchronus communications eliminate communications overhead.

Only changes in current status, however, require the attention of the central processor 110. To avoid burdening the central processing unit 110 with routine tasks, the current embodiment utilizes interface hardware which continuously scans and preprocesses all of the switch, LED and fader data. By scanning approximately ten times faster than the central processor needs data, the interface can apply debounce algorithms and generate finer resolution LED drive wave forms. The continuous and frequent scans also provide fresh memory with short latency.

To avoid the need for repetitious output from the processor, a dual port memory 122 is used as the communication link between the central processor 110 and the interface, or preprocessor. Once a request for action is placed into the dual port memory, the interface can execute the operations indefinitely. For example, a request to flash a specific LED at a rate, dim level and duty cycle requires only one instruction set from the processor. The interface will continue to generate the complex on/off pattern required to flash the LED indefinitely. Since the two sides of the dual port memory 122 are independent and asynchronous, neither the processor nor the interface wastes time waiting for synchronization.

With the interface preprocessing all the inputs from the fader modules 128, the computer can operate in an events driven mode, responding only to changes which have been validated by the interface. If no changes take place, the computer remains in an idling mode waiting for input. Meanwhile, the interface continues to scan at full speed.

To further enhance the processing speed of the interface, an offset interlace pattern of addressing the data input is utilized. For example, the analog-to-digital conversion process requires several microseconds of multiplexing and settling time and several more microseconds for the sampling and conversion of the wave form values. By the time that data is ready, the scanner has already begun processing information for the next fader in the sequence. The addressing must backtrack momentarily to the previous channel to load the data into the correct location of the dual port memory. Since the scanner timing and addressing are designed to accommodate such latencies, the interface can operate at full speed without pausing for responses.

Several ROM lookup tables are included in the interface so that parameters utilized in the computer software can be instantly converted to hardware parameters. These functions include the translation of LED flash attributes to voltage wave forms and the conversion between dB values of fader position used in software to the binary data format used by the analog-to-digital and digital-to-analog systems.

In summary, the functions of the intelligent interface are (1) to provide an asynchronous bidirectional link between the processor and fader peripherals; (2) scan all switch inputs, testing each with a hysteresis algorithm to eliminate contact bounce, to determine if the state of the switch has changed. If a valid change is detected, the transition location and state are logged into a state table which stores the states of all of the devices; (3) scan-requested region of dual port memory for changes in state, loading of FIFO with a queue of all valid transitions so that the control computer can easily check which devices require software servicing; (4) scan and illuminate the numerous indicator lamps with any of several duty cycle and flash rate patterns; (5) read all of the input device positions, translating from raw binary position data to actual logarithmia attenuation values; (6) move the input devices to desired positions, translating from logarithmic attenuation values to raw binary position data, applying appropriate correction for gain and offset errors, and activating the motor drive amplifier for a period of programmed duration; and (7) convert parallel format input and output data from lights, switches and faders into serial format suitable for transmission over a duplex fiberoptic link, transmit and receive the serial data over the fiberoptic links and then reconvert from serial to parallel format at the destination.

There has been described hereinabove a novel automated fader system described with reference to a particular preferred embodiment thereof. Those skilled in the art may now make numerous uses of and departures from the present invention without departing from the inventive concepts disclosed herein. Accordingly, the present invention is to be defined solely by the scope of the following claims.

We claim:

1. A pulley assembly adapted for automated linear movement of a device comprising:
   the first pulley having a first diameter and a circumferential edge, said first pulley being rotatable about a first axis of rotation;
   the second pulley having a second substantially larger diameter and a circumferential edge, said second pulley being rotatable about a second axis of rotation;
   a capstan disposed generally intermediate said first pulley and said second pulley, said capstan being rotatable about a third axis of rotation substantially normal to the plane including said first axis and said second axis;
   a string being attachable to said device and engagingly wound about said capstan without overlapping and around said circumferential edge of each of said first pulley and said second pulley, said first diameter and said second diameter being selected so that said string lies substantially along a first tangent from said first pulley and a second tangent from said second pulley wherein each of said first tangent and said second tangent are substantially perpendicular to lines extending parallel to each of said first axis, said second axis and said third axis.

2. An assembly as set forth in claim 1 wherein said capstan has a generally cylindrical outer surface.

3. A system as set forth in claim 1 wherein said string moves said device along a line parallel to and spaced from a common tangent of said first pulley and said second pulley;.

4. A system as set forth in claim 1 wherein said string is of cofilament construction.

5. A system as set forth in claim 4 wherein said cofilament construction includes a glass fiber core and a polymer sheath.

6. A pulley assembly adapted for automated linear movement of a device comprising:

the first pulley having a first diameter and a circumferential edge, said first pulley being rotatable about a first axis of rotation;

the second pulley having a second substantially larger diameter and a circumferential edge, said second pulley being rotatable about a second axis of rotation;

a capstan disposed generally intermediate said first pulley and said second pulley, said capstan being rotatable about a third axis of rotation substantially normal to the plane including said first axis and said second axis;

a string being attachable to said device and engagingly wound about said capstan without overlapping and around said circumferential edge of each of said first pulley and said second pulley;

one side of the outer surface of said capstan being located substantially along a line extending form the points of engagement of said string with said first and second pulleys; and said string from each of said pulleys initially engaging said one side of said capstan at substantially different points along the length of said capstan.

7. A pulley assembly as defined in claim 6 wherein said string is formed of cofilament construction including a glass fiber core and a polymer sheath.

8. A pulley assembly as defined in claim 7 wherein said string is free of additional tensioning arrangements in addition to the cofilament string construction per set.

9. A pulley assembly as defined in claim 6 including means response to movement of said string for moving said device along a line which is substantially parallel to and spaced from a common tangent of said first and second pulleys.

* * * * *